US012750238B2

(12) United States Patent
Yu et al.

(10) Patent No.: US 12,750,238 B2
(45) Date of Patent: Sep. 29, 2026

(54) FAST SIGNATURE GENERATION AND VERIFICATION

(71) Applicant: QUALCOMM Incorporated, San Diego, CA (US)

(72) Inventors: Qing Yu, Shenzhen (CN); Xiaofeng Tang, Xi'an (CN); Jinglin Wang, Shenzhen (CN); Li Shan, Wuhan (CN); Mingyang Zhou, Shenzhen (CN)

(73) Assignee: QUALCOMM Incorporated, San Diego, CA (US)

( * ) Notice: Subject to any disclaimer, the term of this patent is extended or adjusted under 35 U.S.C. 154(b) by 60 days.

(21) Appl. No.: 18/844,877

(22) PCT Filed: May 4, 2022

(86) PCT No.: PCT/CN2022/090849
§ 371 (c)(1),
(2) Date: Sep. 6, 2024

(87) PCT Pub. No.: WO2023/212838
PCT Pub. Date: Nov. 9, 2023

(65) Prior Publication Data
US 2025/0233753 A1 Jul. 17, 2025

(51) Int. Cl.
*H04L 9/32* (2006.01)
*H04L 9/14* (2006.01)

(52) U.S. Cl.
CPC .............. *H04L 9/3247* (2013.01); *H04L 9/14* (2013.01); *H04L 9/3242* (2013.01)

(58) Field of Classification Search
CPC ........ H04L 9/3247; H04L 9/14; H04L 9/3242
(Continued)

(56) References Cited

U.S. PATENT DOCUMENTS 6,834,110 B1 12/2004 Marconcini et al.
7,447,904 B1 11/2008 Boggs et al.
(Continued)

FOREIGN PATENT DOCUMENTS

JP 2012114934 A 6/2012
WO WO-2019222995 A1 * 11/2019 ............ H04W 24/02

OTHER PUBLICATIONS

International Search Report and Written Opinion—PCT/CN2022/090849—ISA/EPO—Dec. 26, 2022.
(Continued)

*Primary Examiner* — Anthony D Brown
(74) *Attorney, Agent, or Firm* — Loza & Loza LLP

(57) ABSTRACT

Aspects of the disclosure are directed to fast signature generation and verification. In accordance with one aspect, the apparatus includes a memory for storing the file; a processor for generating a first digest of the file and for generating a partial digest table of the file; and a communication bus for delivering the file, the first digest and the partial digest table to a repository. In another aspect, the apparatus includes a memory for storing the file; a communication bus for extracting a partial digest table from the file; and a processor for decomposing the partial digest table to generate a delivered partial digest, generating a recipient partial digest using a hash function, comparing the recipient partial digest with the delivered partial digest to generate a comparison; and determining a SUCCESS state or determining a FAILED state.

15 Claims, 9 Drawing Sheets

(58) Field of Classification Search
USPC .......................................................... 713/189
See application file for complete search history.

(56) References Cited

U.S. PATENT DOCUMENTS

| | | | | |
|---|---|---|---|---|
| 2002/0002680 | A1 | 1/2002 | Carbajal et al. | |
| 2011/0237326 | A1 * | 9/2011 | Murakami | G06F 21/64 463/44 |
| 2013/0243190 | A1 | 9/2013 | Yang et al. | |
| 2017/0070890 | A1 | 3/2017 | Luff et al. | |
| 2017/0235957 | A1 * | 8/2017 | Maletsky | H04L 63/0807 713/168 |
| 2020/0057861 | A1 * | 2/2020 | Ujvari | H04L 9/0643 |
| 2021/0019259 | A1 * | 1/2021 | Suryawanshi | G06F 9/5077 |
| 2021/0119810 | A1 | 4/2021 | Burke-Aguero et al. | |
| 2021/0135862 | A1 * | 5/2021 | Morales | H04L 9/50 |
| 2022/0045863 | A1 * | 2/2022 | Bai | H04L 9/3239 |

OTHER PUBLICATIONS

Khalil M., et al., "Implementation of SHA-2 Hash Function for a Digital Signature System-on-Chip in FPGA", 2008 International Conference on Electronic Design, Dec. 3, 2008, 6 Pages, The whole document.

Supplementary European Search Report—EP22940534—Search Authority—Munich—Dec. 1, 2025.

* cited by examiner

FAST SIGNATURE GENERATION AND VERIFICATION

TECHNICAL FIELD

This disclosure relates generally to the field of fast signature generation and verification, and, in particular, to fast signature generation and verification for digital signal processor (DSP) library files.

BACKGROUND

Information assurance of digital content provides information security against a variety of adversarial threats. A digital signature (e.g., an encrypted appended data tag) is one important information assurance technique which provides authentication (verification of digital content originator) and integrity (verification of unaltered digital content). However, the verification of digital content using a digital signature may add undesired processing overhead in time-critical applications, such as processor library downloading upon initialization. Hence, there is a need for an efficient way of authentication and integrity execution using digital signatures.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides fast signature generation and verification. Accordingly, an apparatus for fast digital signature generation of a file, the apparatus including: a memory configured for storing the file; a processor coupled to the memory, the processor configured for generating a first digest of the file and for generating a partial digest table of the file; and a communication bus coupled to the processor, the communication bus configured for delivering the file, the first digest and the partial digest table to a repository.

In one example, the processor is further configured for generating the first digest using a hash function. In one example, the partial digest table comprises a partial digest and random addresses. In one example, the processor is further configured for generating the partial digest using a hash function and a cryptographic key. In one example, the cryptographic key is a private key associated with a public key, wherein the private key and the public key are part of a matched asymmetric key pair. In one example, the hash function is a secure hash algorithm (SHA).

Another aspect of the disclosure provides an apparatus for fast digital signature verification of a file, the apparatus including: a memory configured for storing the file; a communication bus coupled to the memory, the communication bus configured for extracting a partial digest table from the file; and a processor coupled to the communication bus, the processor configured for: decomposing the partial digest table to generate a delivered partial digest and a plurality of delivered random addresses, generating a recipient partial digest using a hash function, comparing the recipient partial digest with the delivered partial digest to generate a comparison, and determining a SUCCESS state for the file if the comparison results in a perfect agreement between the recipient partial digest and the delivered partial digest or determining a FAILED state for the file if the comparison results in a disagreement between the recipient partial digest and the delivered partial digest.

In one example, the hash function is a secure hash algorithm (SHA). In one example, the processor is further configured for generating the recipient partial digest using a cryptographic key. In one example, the cryptographic key is a public key associated with a private key, wherein the private key and the public key are part of a matched asymmetric key pair. In one example, the processor is further configured for generating the recipient partial digest using the file. In one example, the comparison is a bitwise logical exclusive OR (XOR) operation on the recipient partial digest and the delivered partial digest.

Another aspect of the disclosure provides a method for fast digital signature generation of a file including: generating a first digest of the file; generating a partial digest table of the file; and delivering the file, the first digest and the partial digest table to a repository.

In one example, the method further includes generating the first digest using a hash function. In one example, the partial digest table comprises a partial digest and a plurality of random addresses. In one example, the method further includes generating the partial digest using a hash function and a cryptographic key. In one example, the cryptographic key is a private key associated with a public key, wherein the private key and the public key are part of a matched asymmetric key pair. In one example, the hash function is a secure hash algorithm (SHA).

Another aspect of the disclosure provides a method for fast digital signature verification of a file including: extracting a partial digest table from the file; decomposing the partial digest table to generate a delivered partial digest and a plurality of delivered random addresses; generating a recipient partial digest using a hash function; comparing the recipient partial digest with the delivered partial digest to generate a comparison; and determining a SUCCESS state for the file if the comparison results in a perfect agreement between the recipient partial digest and the delivered partial digest or determining a FAILED state for the file if the comparison results in a disagreement between the recipient partial digest and the delivered partial digest.

In one example, the hash function is a secure hash algorithm (SHA). In one example, the method further includes generating the recipient partial digest using a cryptographic key. In one example, the cryptographic key is a public key associated with a private key, wherein the private key and the public key are part of a matched asymmetric key pair. In one example, the method further includes generating the recipient partial digest using the file. In one example, the comparison is a bitwise logical exclusive OR (XOR) operation on the recipient partial digest and the delivered partial digest.

Another aspect of the disclosure provides a non-transitory computer-readable medium storing computer executable code, operable on a device including at least one processor and at least one memory coupled to the at least one processor, wherein the at least one processor is configured to implement a fast digital signature generation of a file, the computer executable code including: instructions for causing a computer to generate a first digest of the file; instructions for causing the computer to generate a partial digest table of the file; and instructions for causing the computer to deliver the file, the first digest and the partial digest table to a repository.

In one example, the non-transitory computer-readable medium further includes instructions for causing the computer to generate the first digest using a hash function, and wherein the partial digest table comprises a partial digest and file data specified by random library addresses. In one example, the non-transitory computer-readable medium further includes instructions for causing the computer to generate the partial digest using a hash function and a cryptographic key, wherein the cryptographic key is a private key associated with a public key, wherein the private key and the public key are part of a matched asymmetric key pair.

Another aspect of the disclosure provides a non-transitory computer-readable medium storing computer executable code, operable on a device including at least one processor and at least one memory coupled to the at least one processor, wherein the at least one processor is configured to implement a fast digital signature verification of a file, the computer executable code including: instructions for causing a computer to extract a partial digest table from the file; instructions for causing the computer to decompose the partial digest table to generate a delivered partial digest and a plurality of delivered random addresses; instructions for causing the computer to generate a recipient partial digest using a hash function; instructions for causing the computer to compare the recipient partial digest with the delivered partial digest to generate a comparison; and instructions for causing the computer to determine a SUCCESS state for the file if the comparison results in a perfect agreement between the recipient partial digest and the delivered partial digest or to determine a FAILED state for the file if the comparison results in a disagreement between the recipient partial digest and the delivered partial digest.

In one example, the non-transitory computer-readable medium further includes instructions for causing the computer to generate the recipient partial digest using a cryptographic key, wherein the cryptographic key is a public key associated with a private key, wherein the private key and the public key are part of a matched asymmetric key pair. In one example, the non-transitory computer-readable medium further includes instructions for causing the computer to generate the recipient partial digest using the file.

These and other aspects of the present disclosure will become more fully understood upon a review of the detailed description, which follows. Other aspects, features, and implementations of the present disclosure will become apparent to those of ordinary skill in the art, upon reviewing the following description of specific, exemplary implementations of the present invention in conjunction with the accompanying figures. While features of the present invention may be discussed relative to certain implementations and figures below, all implementations of the present invention can include one or more of the advantageous features discussed herein. In other words, while one or more implementations may be discussed as having certain advantageous features, one or more of such features may also be used in accordance with the various implementations of the invention discussed herein. In similar fashion, while exemplary implementations may be discussed below as device, system, or method implementations it should be understood that such exemplary implementations can be implemented in various devices, systems, and methods.

DETAILED DESCRIPTION

Figure 1:
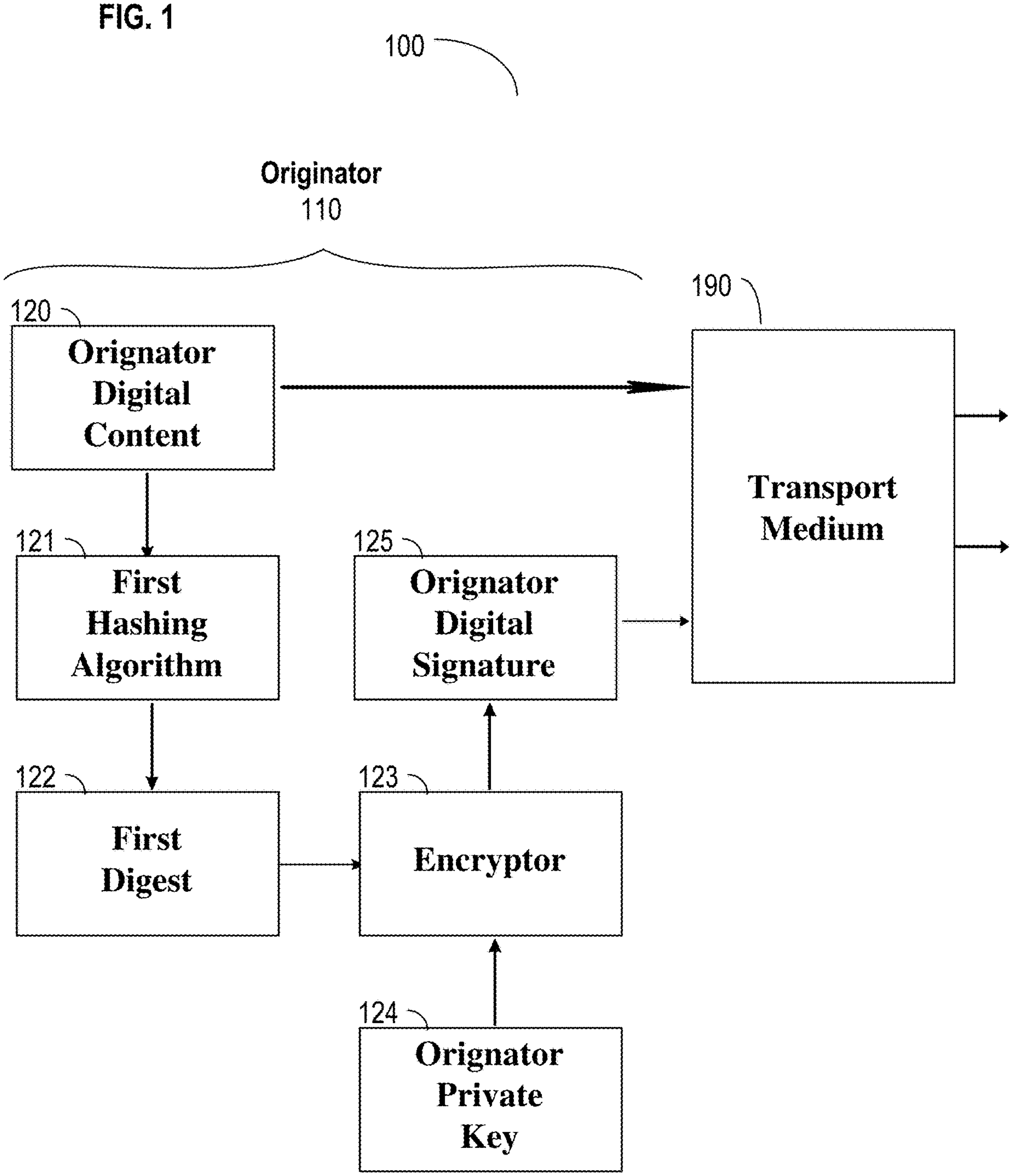
FIG. 1 illustrates an example of a generic processing flow diagram for digital signature verification.
Figure 1:
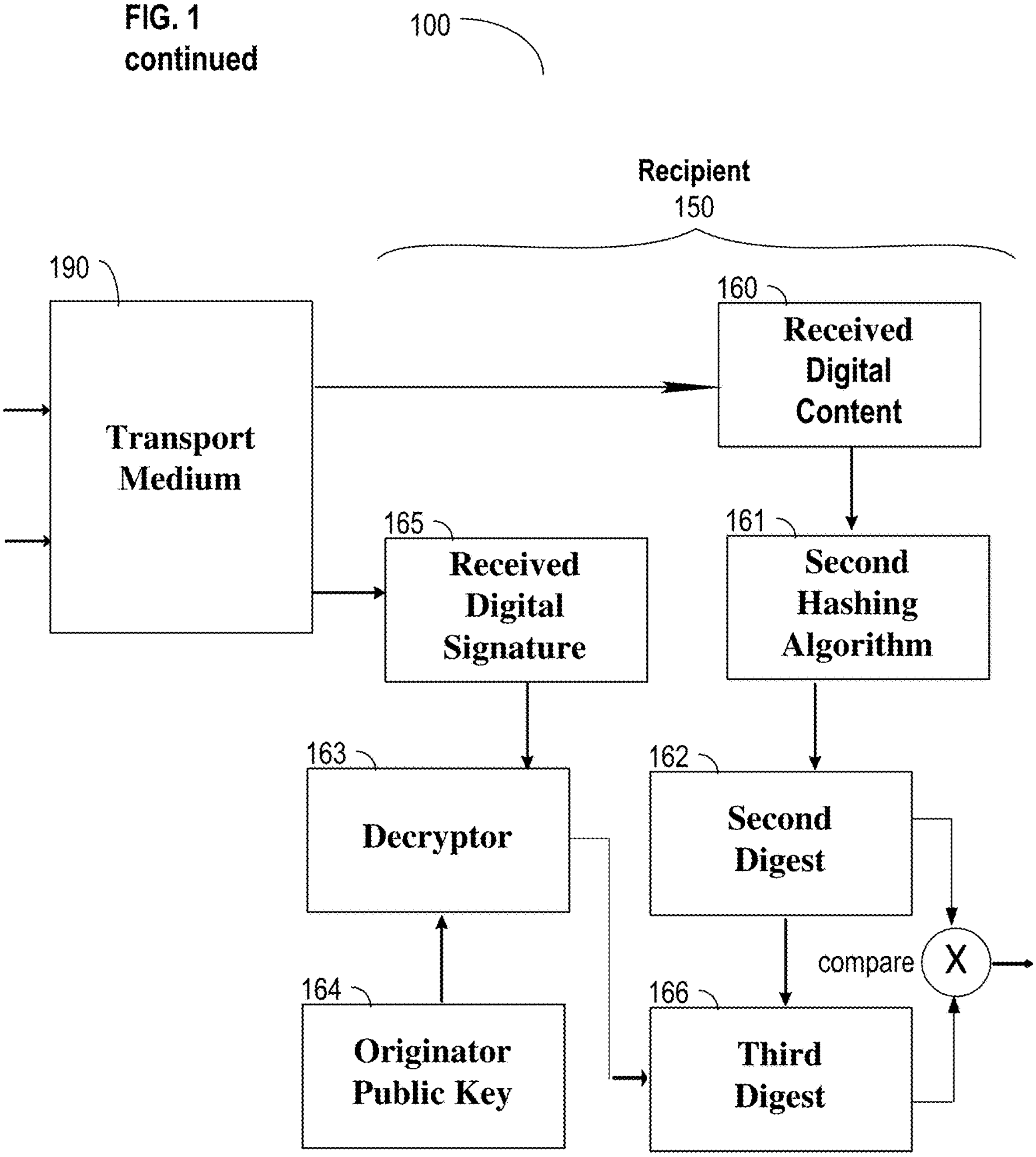

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Information assurance (IA) is a critical function in contemporary communication, storage and processing applications. The ubiquity of digital content in the modern world also results in widespread challenges in maintaining information security of digital content against multi-faceted threats such as an adversarial attack. In this context, digital content may include a message, a document, a file, software, library files, audio, video, imagery, etc. In general, digital content is a set of bits which are related or grouped together to form a larger entity.

One such information security challenge is authentication, that is, the verification of the true originator of digital content. Authentication is intended to provide assurance that the digital content has a known origin or identity. In one example, authentication ensures that the digital content retrieved by a recipient is legitimate and no impersonation has occurred.

Another information security challenge is data integrity, that is, the verification that the digital content has not been altered in transit from the originator to the recipient. That is, integrity implies that original digital content is preserved after transfer, storage, retrieval, etc. and no tampering has occurred.

One solution to the needs for authentication and integrity of digital content is through the usage of digital signatures. A digital signature may be an appended data file, also known as a tag, which may be encrypted or coded in such a manner that the recipient of the digital content can validate its authenticity and integrity prior to its usage.

In one example, a digital signature may be generated using a hash function. In one example, a hash function is a mathematical transformation of arbitrary input data into a digest, or hash, of the input data. For example, the digest may be a fixed-length digest. In one example, the digest is a data fingerprint which may be used to detect a change in the input data. For example, the input data is the digital content and the digest is a compact representation of the digital content. For example, the hash function may be executed by a hashing algorithm.

For example, the hash function may have a number of desirable properties for information security purposes. In one example, an input to a hash function H may be denoted as X and an output of the hash function may be denoted as Y=H(X). That is, the input X is transformed into the output Y by the hash function H. For example, the hash function may be a one-way function. For example, a one-way function has the property where its output Y may be easily computed from its input X but where it is computationally infeasible to determine its input X given its output Y. For example, the hash function may be selected such that an incremental change in the input data results in a large change in the digest. For example, the hash function may be selected to provide collision resistance, that is, it is computationally infeasible to find any two different inputs $X_1$, $X_2$ such that $H(X_1)=H(X_2)$. In one example, computationally infeasible means that there is no practical means for a successful execution with present-day computing resources.

In one example, there are two generic cryptographic systems: public key cryptography and private key cryptography. Public key cryptography (i.e., asymmetric cryptography), which uses a matched asymmetric key pair (i.e., a private (secret) key $S_k$ and a public key $P_k$), is a major enabler of digital signature technology. Authentication of a received digital content may be verified by encrypting either the digital content or its digest with a private key $S_k$ to produce a digital signature which is sent to a recipient. Next, the received digital signature may be decrypted using a public key $P_k$ which is matched to the private key $S_k$ to recover a received digital content or a validation digest. For example, authentication may be performed by computing a recipient digest (from the received digital content) and by comparing the recipient digest with the validation digest.

In one example, the utilization of public key cryptography enables information security without the constraint of delivering two private keys to both the originator and the recipient, as in private key cryptography (i.e., symmetric cryptography). That is, the public key may be distributed openly over any suitable channel, including an insecure channel. In contrast, the private key must be distributed only over a secure channel and cannot use open distribution.

For example, the digest is encrypted using an originator private key $S_k$ to produce an originator digital signature at an originator. In one example, the originator digital signature is sent to a recipient along with originator digital content. Subsequently, in one example, the recipient generates a recipient digest from the received digital content using the hash function. In one example, the recipient also decrypts the received digital signature using an originator public key $P_k$ to produce a validation digest. For example, the originator private key and the originator public key are a matched asymmetric key pair. In one example, authentication may be determined by comparing the recipient digest with the validation digest. If the recipient digest is identical to the validation digest, the received digital content is authenticated (i.e., the received digital content has a verified origination). If the recipient digest and the validation digest differ, the received digital content is not authenticated (i.e., the received digital content does not have a verified origination). In one example, usage of the matched asymmetric key pair with a digital signature allows authentication of the received digital content.

In one example, digital signature verification requires at least three algorithms for authentication: (1) key generation algorithm—to generate cryptographic keys (e.g., a private key $S_k$, a public key $P_k$), (2) signing algorithm—to generate a digital signature with a cryptographic key, (3) verification algorithm—to verify authenticity of delivered digital content. For example, the cryptographic keys are a matched asymmetric key pair (i.e., private key matched with a public key).

FIG. 1 illustrates an example of a generic processing flow diagram 100 for digital signature verification. For example, an originator 110 sends originator digital content 120 to a recipient 150 over a transport medium 190 where it is received as a received digital content 160. In one example, the transport medium 190 is a communication channel, such as a network. In another example, the transport medium 190 is a storage channel, such as a memory. In another example, the transport medium 190 is a processing channel, such as a computing device. In one example, the originator digital content 120 is inputted to a first hashing algorithm 121 to generate a first digest 122. For example, the first hashing algorithm 121 implements a selected hash function (e.g., SHA-256). In one example, the originator digital content 120 has arbitrary length and the first digest 122 has a first fixed length. In one example, the first digest 122 is encrypted by an encryptor 123 using an originator private key 124 to produce an originator digital signature 125. For example, the originator digital signature 125 is an encrypted version of the first digest 122. In one example, the originator digital content 120 may also be encrypted to produce an encrypted digital content 126 which may be sent to the recipient 150 over the transport medium 190.

In one example, the received digital content 160 is inputted to a second hashing algorithm 161 to generate a second digest 162. For example, the second hashing algorithm 161 implements the selected hash function. In one example, the received digital content 160 has arbitrary length and the second digest 162 has a second fixed length. For example, the first hashing algorithm 121 and the second hashing algorithm 161 are identical. In one example, the received digital content 160 is first decrypted prior to being inputted to the second hashing algorithm 161 (e.g., if the originator digital content 120 was encrypted at the originator 110).

In one example, the originator digital signature 125 is sent to the recipient 150 over the transport medium 190 where it is received as a received digital signature 165. For example, the received digital signature 165 is decrypted by a decryptor 163 using an originator public key 164 to produce a third digest 166. In one example, the originator private key 124 and the originator public key 164 are a matched asymmetric key pair. In one example, authentication may be determined by comparing the second digest 162 with the third digest 166. If the third digest 166 is identical to the second digest 162, the received digital content 160 is authenticated or verified (i.e., the received digital content 160 has a verified origination). If the third digest 166 and the second digest 162 differ, the received digital content 160 is not authenticated or not verified (i.e., the received digital content 160 does not have a verified origination).

In one example, digital signature verification may be performed for authentication and integrity checking of processor library file downloading for a digital signal processor (DSP). In one example, a processor library file is digital content. For example, the DSP may rely on a plurality of processor library files to execute various functions, such as fast Fourier transformation (FFT), correlation processing, statistical processing, neural network processing, diagnostic gathering, performance measurement, etc. In one example, the processor library files are stored in a repository and need to be ingested by a processing engine to perform certain tasks. As such, as part of the downloading of processor library files, information security tasks may be performed, such as authentication and integrity verification. In one example, a digital signature associated with a particular processor library file needs to be verified.

In one example, an electronic device, for example, a mobile phone, includes a plurality of processing engines such as a digital signal processor (DSP). The plurality of processing engines may include a central processing unit (CPU) for supervisory tasks and a plurality of DSPs for specialized tasks, especially numerically-intensive tasks, such as graphics processing, modem processing, image processing, etc. In one example, the DSP is a compute DSP for generic computation.

For example, the DSP may execute several algorithms such as compute vision (CV), artificial intelligence (AI), voice/audio processing, video processing, image processing, sensor processing, etc. In one example, the algorithms utilize a plurality of files, for example, processor library files, to execute certain computation tasks. For example, each file requires a digital signature verification for authentication upon downloading from a repository.

In one example, a computer produces a selected file and generates a digital signature to the selected file during software/firmware compilation. In one example, a user process domain which utilizes the selected file needs to verify the appended digital signature when downloading files from a repository. In one example, a process domain is a basic unit of system resources, for example, a process domain may include its own address space and one control thread.

In one example, a process for downloading a selected file in a user process domain, for example, a processor (e.g., a DSP) domain, is summarized as the following two steps:

- Download the selected file to a local memory (e.g., a double data rate (DDR) random access memory (RAM)) and map memory locations of the local memory to DSP memory
- Perform a full digital signature verification with a digest (e.g., hash value) of the selected file.

In one example, the full digital signature verification may require a timeline which is a substantial portion of the total file downloading time. For example, a particular processor library file (e.g., a neural network framework for a neural processing engine) may require 112 ms for downloading and 123 ms for full digital signature verification, for a total execution time of 235 ms. That is, digital signature verification may take the majority of total time required for file downloading.

Figure 2:
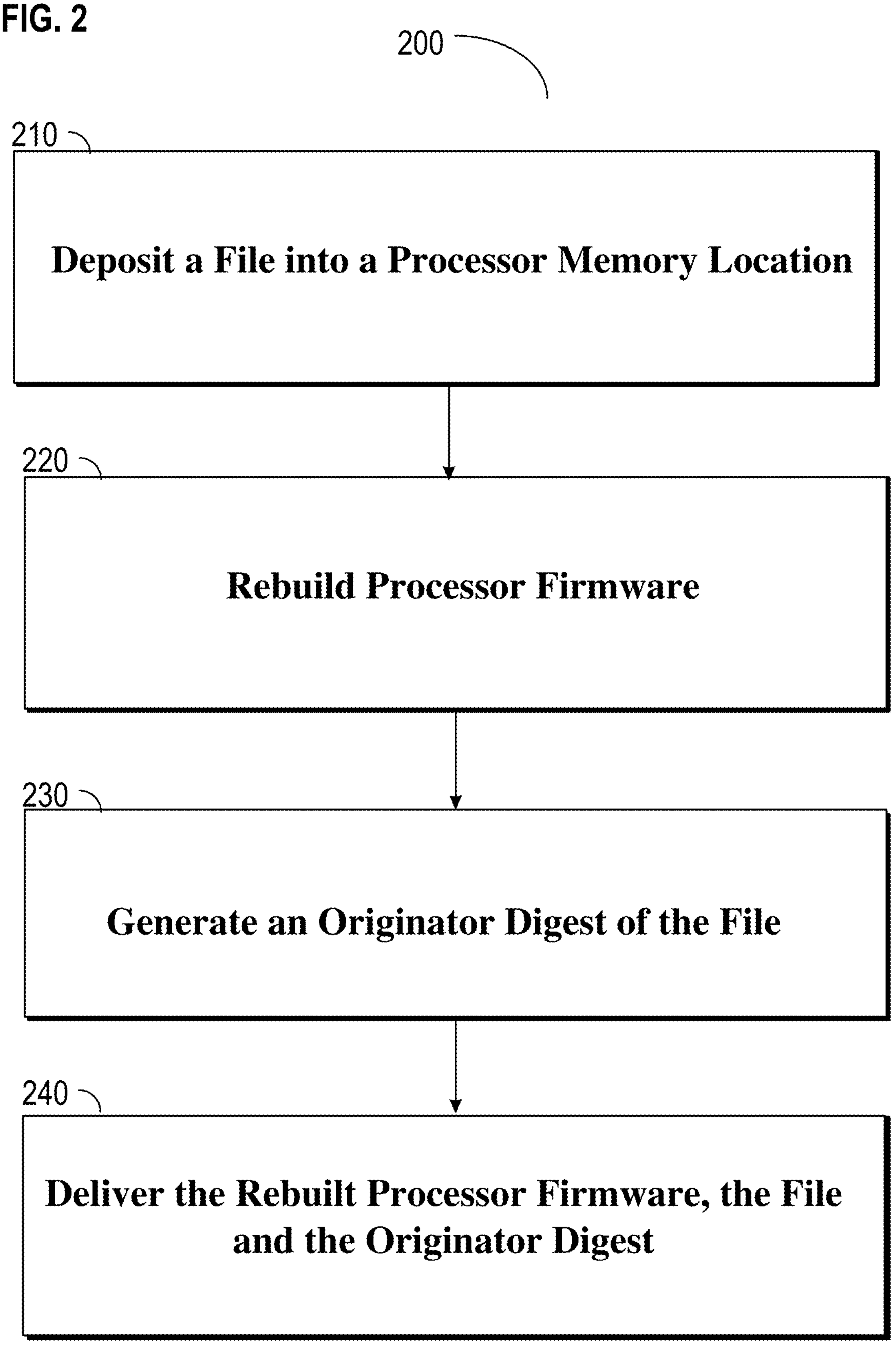
FIG. 2 illustrates an example flow diagram of a full signature generation of a file.

FIG. 2 illustrates an example flow diagram 200 of a full signature generation of a file. In box 210, deposit a file into a processor memory location. For example, the file is a processor library file. In one example, the processor memory location is indicated by a root directory path. For example, the processor is a digital signal processor (DSP). In box 220, rebuild processor firmware. In one example, rebuilding processor firmware includes compiling the processor firmware.

In box 230, generate an originator digest of the file. In one example, the originator digest is generated using a hash function with the file as input. In one example, the hash function is a secure hash algorithm (SHA), e.g., SHA-256. For example, the originator digest is generated using a hash function with a cryptographic key. For example, the cryptographic key is a private key. In one example, the generation is performed during firmware compilation. In one example, the originator digest is saved into the processor firmware. In box 240, deliver the rebuilt processor firmware, the file and the originator digest from an originator process domain to a user process domain. In one example, the delivery is performed using a shared communication bus.

Figure 3:
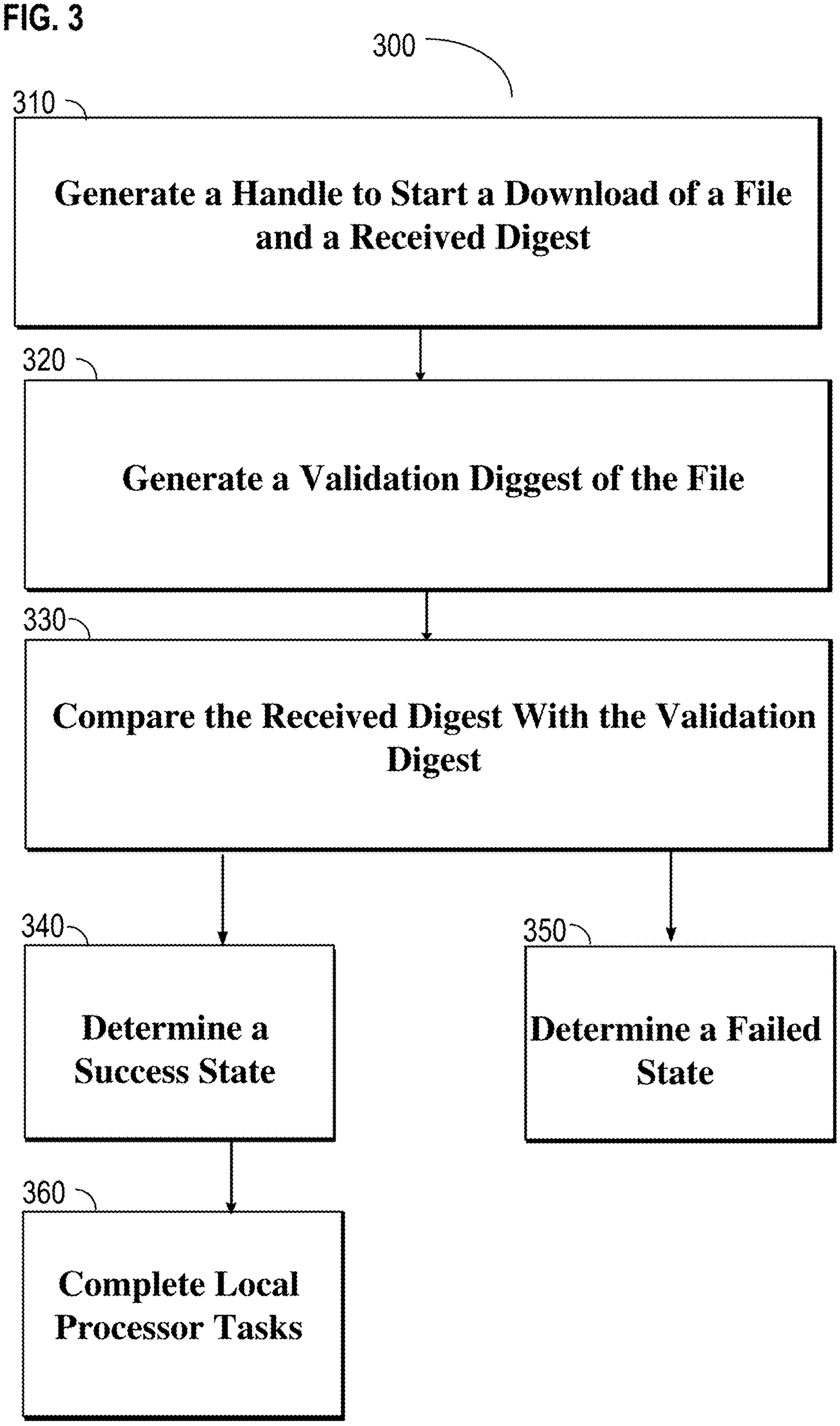
FIG. 3 illustrates an example flow diagram of a full signature verification of a file.

FIG. 3 illustrates an example flow diagram 300 of a full signature verification of a file. In box 310, generate a handle to start a download of a file and a received digest in a processor in a user process domain. For example, the file is a processor library file. For example, the received digest is a received version of an originator digest. In one example, the originator digest is generated with a hash function and a private key at an originator. In one example, the received digest is decrypted with a cryptographic key. For example, the cryptographic key is a public key. For example, the public key is associated with the private key as part of a matched asymmetric key pair. In one example, a handle is a unique identifier for each algorithm calling on the processor during a session.

In box 320, generate a validation digest of the file. In one example, the validation digest is generated using the hash function with the file as input. In one example, the hash function is a secure hash algorithm (SHA), e.g., SHA-256. For example, the validation digest is generated using the hash function. In box 330, compare the received digest with the validation digest. In one example, the comparison is a bitwise logical exclusive OR (XOR) operation on the received digest and the validation digest. If the comparison results in a perfect agreement between the received digest and the validation digest, proceed to box 340 and determine a SUCCESS state. If the comparison results in a disagreement between the received digest and the validation digest, proceed to box 350 and determine a FAILED state. In box 340, after determining a SUCCESS state, load and execute the file in a local processor. In one example, the local processor is a DSP. In box 350, after determining a FAILED state, create an error message. In box 360, complete local processor tasks, terminate the handle and return the file to the user process domain.

Figure 4:
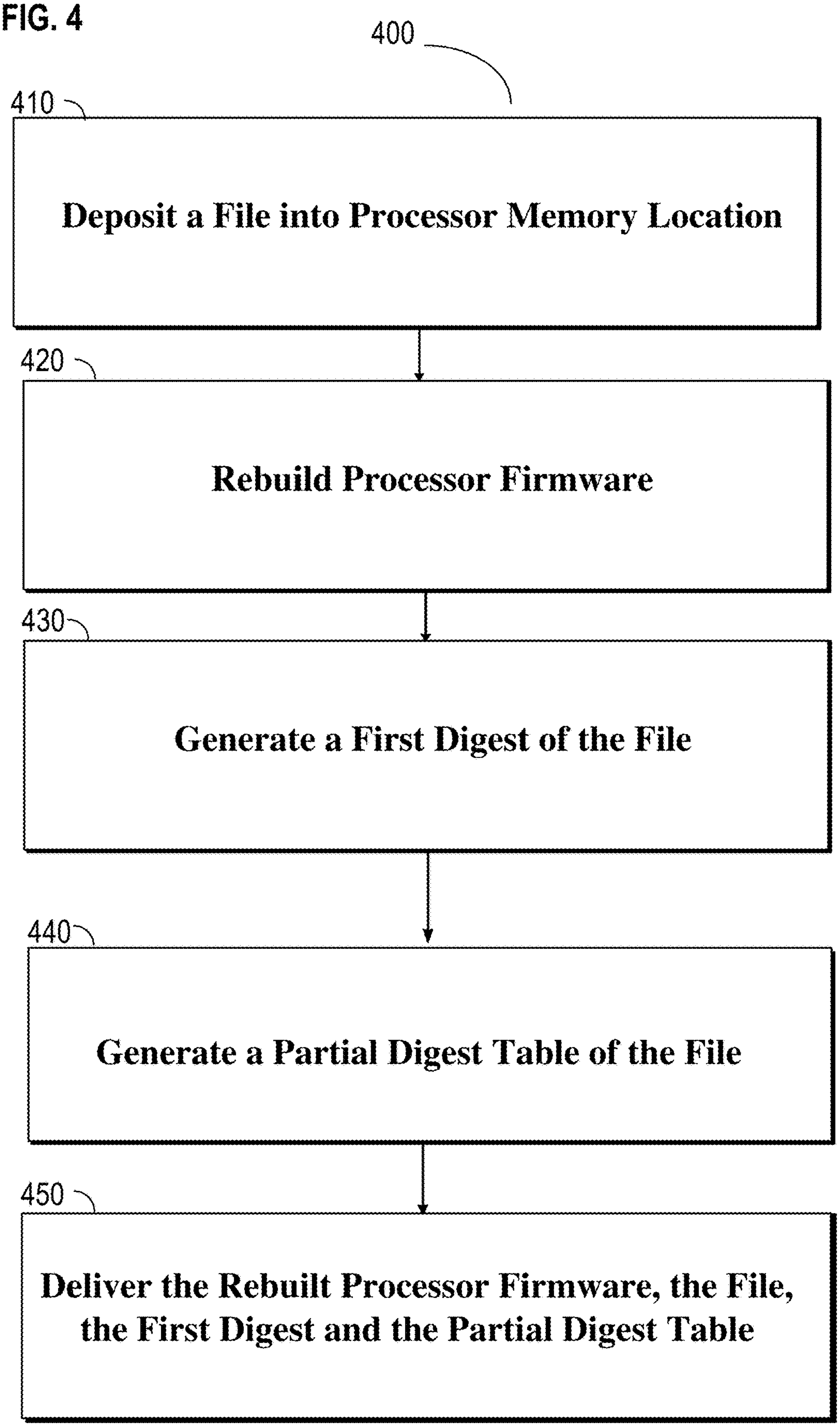
FIG. 4 illustrates an example flow diagram of a fast signature generation of a file.

FIG. 4 illustrates an example flow diagram 400 of a fast signature generation of a file. In box 410, deposit a file into a processor memory location. For example, the file is a processor library file. In one example, the processor memory location is indicated by a root directory path. For example, the processor is a digital signal processor (DSP). In box 420, rebuild processor firmware. In one example, rebuilding processor firmware includes compiling the processor firmware.

In box 430, generate a first digest of the file. In one example, the first digest is generated using a selected hash function with the file as input. In one example, the selected hash function is a secure hash algorithm (SHA), e.g., SHA-256. For example, the first digest is generated using the selected hash function with a cryptographic key. For example, the cryptographic key is a private key. For example, a public key is associated with the private key as part of a matched asymmetric key pair. In one example, the generation is performed during firmware compilation. In one example, the first digest is stored with the processor firmware.

In box 440, generate a partial digest table of the file. In one example, a partial digest is generated using the selected hash function with the file as input. For example, the partial digest is a subset of the partial digest table. In one example, the selected hash function is a secure hash algorithm (SHA), e.g., SHA-256. For example, the partial digest is generated using the selected hash function and a cryptographic key. For example, the cryptographic key is a private key. For example, a public key is associated with the private key, wherein the public key and the private key are part of a matched asymmetric key pair. In one example, the generation is performed during firmware compilation. In one example, the partial digest table is stored with the processor firmware.

In one example, the partial digest table includes both the partial digest and random addresses. For example, the generation of the partial digest also generates a plurality of random numbers (e.g., quantity of M random numbers). For example, each random number may consist of a plurality of bytes (e.g., quantity of K bytes per random number). In one example, the quantity of bytes per random number is 4 (i.e., K=4). For example, each random number is used as a random address to read data from a location in the file.

In one example, the partial digest table includes one byte from each location specified by each random address. In one example, the selected hash function generates the partial digest from the sampled segment of M bytes. In one example, the size of the partial digest is P bytes. For example, P=32. For example, the sampled segment refers to M file values specified by the addresses.

In one example, the partial digest table includes the partial digest of P bytes and the K*M random addresses. For example, the size of the partial digest table is (P+K*M) bytes. In one example, the quantity M is set to a fraction F of the file size S. For example, the fraction is 0.1%. For example, the quantity M has a minimum value $M_{min}$. In one example, the quantity M is set to the maximum of F*S and $M_{min}$. For example, $M_{min}$=30. In one example, the quantity M is selected to ensure a random selection of data from the file. In one example, the random addresses are stored to obtain values from library files and to generate recipient partial digest during fast signature verification.

For example, if the file size S is 1 Megabyte (i.e., 1 MB) and F=0.001, then M=1000. For example, if the file size S is 10 kilobytes (i.e., 10 kB), F=0.001 and $M_{min}$=30, then M=max(F*S, $M_{min}$)=max(10, 30)=30. For example, the quantity M is lower bounded by $M_{min}$.

In one example, the partial digest table generation is repeated N times such that N total partial digest tables are generated. For example, each partial digest table has a partial digest of P bytes based on a sampled segment of M bytes. In one example, N=5 (i.e., a total of 5 partial digest tables are generated). In one example, one partial digest table out of N total partial digest tables is selected during signature verification. In one example, the quantity N is selected to ensure a random selection of a partial digest table used for signature verification. In one example, the partial digest table generation results in N total partial digest tables with K*M*N bytes of random addresses and N*P bytes of partial digests.

In box 450, deliver the rebuilt processor firmware, the file, the first digest and the partial digest table from an originator to a recipient. In one example, the delivery is performed using a shared communication bus. In one example, the recipient is a mobile device. For example, the delivery is to a storage device in the recipient.

Figure 5:
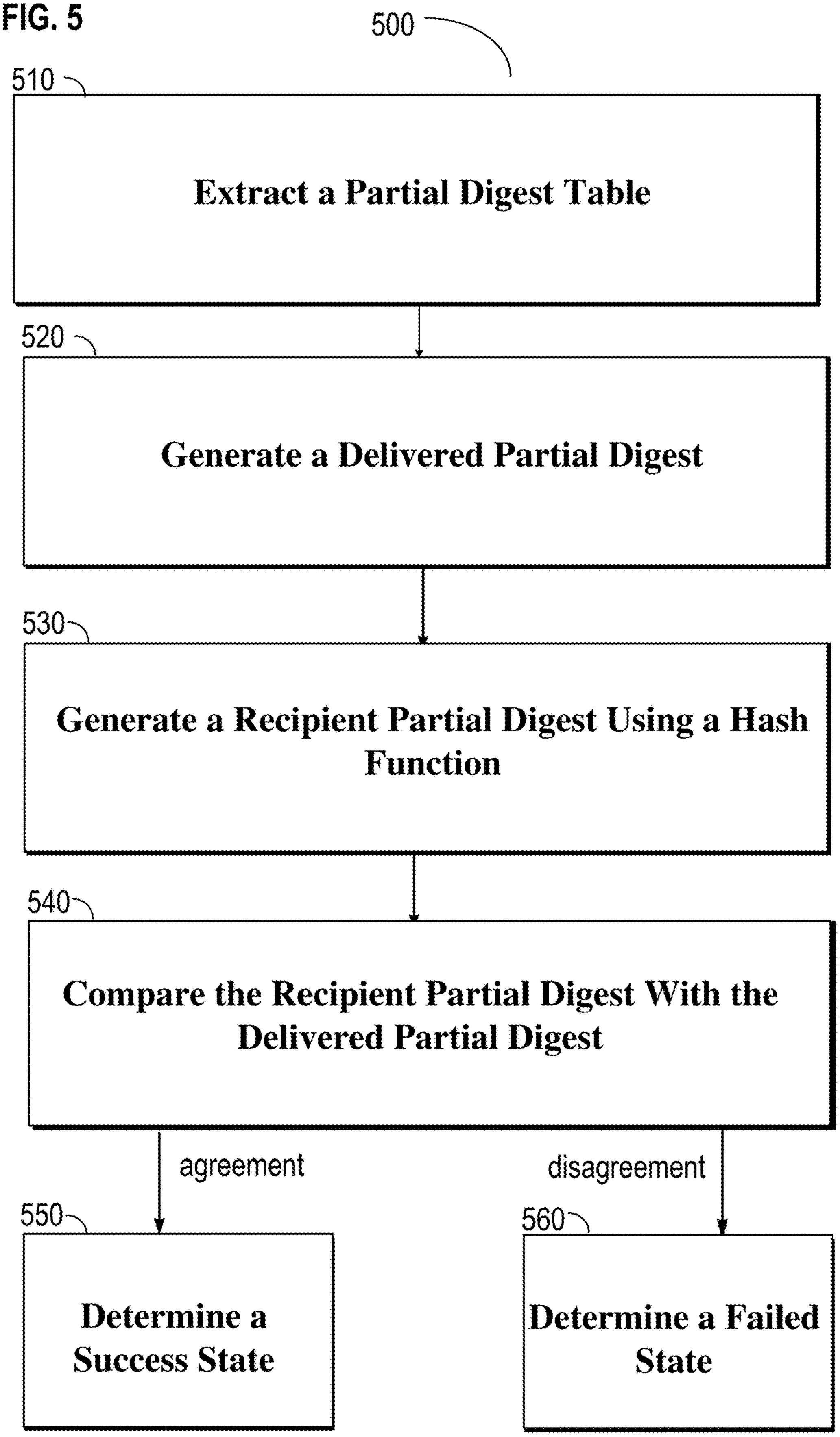
FIG. 5 illustrates an example flow diagram of a fast signature verification of a file.

FIG. 5 illustrates an example flow diagram 500 of a fast signature verification of a file. In box 510, extract a partial digest table in a user process domain by randomly selecting one of N total partial digest tables. In one example, the total partial digest tables are generated during firmware compilation.

In box 520 decompose the partial digest table to generate a delivered partial digest. For example, the delivered partial digest is obtained by reading P bytes of data from the selected partial digest table. For example, the delivered file is a delivered processor library file.

In box 530, generate a recipient partial digest using a hash function. In one example, the recipient partial digest is generated using the hash function with the delivered file as input. In one example, the hash function is a secure hash algorithm (SHA), e.g., SHA-256. For example, the recipient partial digest is generated using the hash function and a cryptographic key. For example, the cryptographic key is a public key. For example, the public key is associated with a private key, wherein the public key and the private key are part of a matched asymmetric key pair. In one example, the size of the recipient partial digest is P bytes. For example, P=32.

In one example, the partial digest table extraction is executed after recipient initialization, firmware download to local memory, and local processor initialization. For example, the local processor initialization includes creation of the user process domain. In one example, read K*M bytes of random addresses from the selected partial digest table. For example, read M bytes of sampled segment values from the random addresses of the file. For example, generate a recipient partial digest of P bytes with the sampled segment values.

In box 540, compare the recipient partial digest with the delivered partial digest. In one example, the comparison is a bitwise logical exclusive OR (XOR) operation on the recipient partial digest and the delivered partial digest. If the comparison results in a perfect agreement between the recipient partial digest and the delivered partial digest, proceed to box 550 and determine a SUCCESS state for the delivered file. If the comparison results in a disagreement between the recipient partial digest and the delivered partial digest, proceed to box 560 and determine a FAILED state for the delivered file.

In box 550, after determining a SUCCESS state for the delivered file, load and execute the delivered file in a local processor. In one example, the local processor is a DSP. In box 560, after determining a FAILED state for the delivered file, mark the delivered file as UNVERIFIED in a local processor and create an error message.

Figure 6:
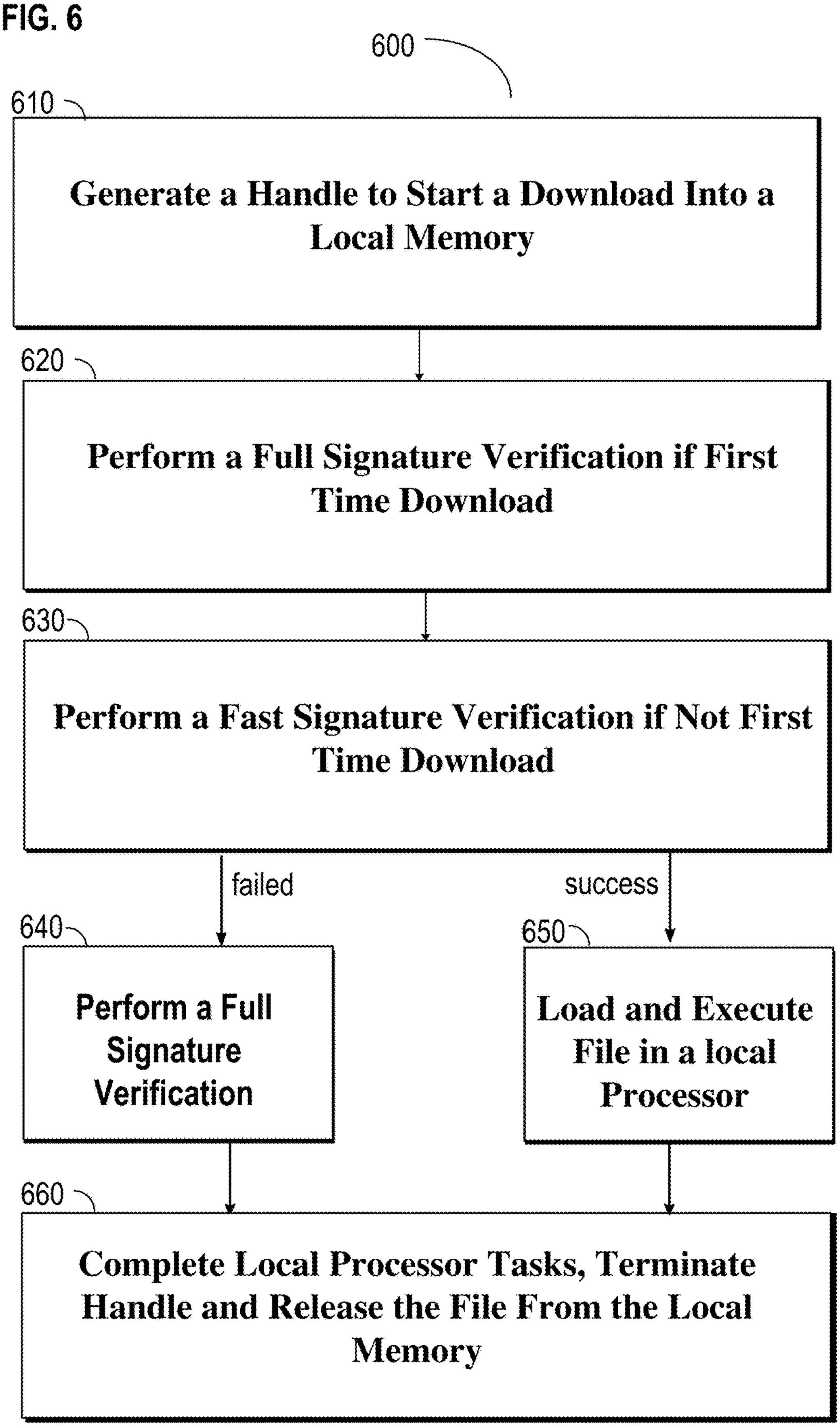
FIG. 6 illustrates an example flow diagram of a composite signature verification of a file.

FIG. 6 illustrates an example flow diagram 600 of a composite signature verification of a file. In box 610, generate a handle to start a download of a file into a local memory (e.g., DDR memory) in a user process domain. In box 620, perform a full signature verification of the file if the downloading is being performed for the first time. In one example, the full signature verification follows the description of FIG. 3.

In box 630, perform a fast signature verification of the file if the downloading is being performed not for the first time, i.e., after being previously downloaded. In one example, the fast signature verification follows the description of FIG. 5. In box 640, if the fast signature verification results in a FAILED state declaration for the file, perform a full signature verification of the file. In one example, the full signature verification follows the description of FIG. 3.

In box 650, if the fast signature verification results in a SUCCESS state declaration for the file, load and execute the file in a local processor. In one example, the local processor is a DSP. In box 660, complete local processor tasks, terminate the handle and release the file from the local memory.

In one example, a default location for file storage is a memory card (e.g., Embedded Multi-Media Card (EMMC), NAND (not AND) flash, etc.). In one example, upon algorithm execution, the file may be loaded into a double data rate (DDR) memory and mapped into a digital signal processor (DSP) memory. Upon algorithm completion, the file may be demapped from DSP memory and released from the DDR memory.

In one example, the method for composite signature verification of a file performs a full signature verification upon an initial downloading of the file. Next, the method performs a partial signature verification upon each subsequent downloading of the file. For example, usage of the composite signature verification method greatly reduces the total verification time over the processor lifetime while maintaining a low security risk.

For example, if the file size is 5 MB, only a few bytes (e.g., 32 bytes) may be needed to perform the partial signature verification after the initial downloading. For example, the verification time for each subsequent downloading is greatly reduced relative to the verification time for a full signature verification.

Figure 7:
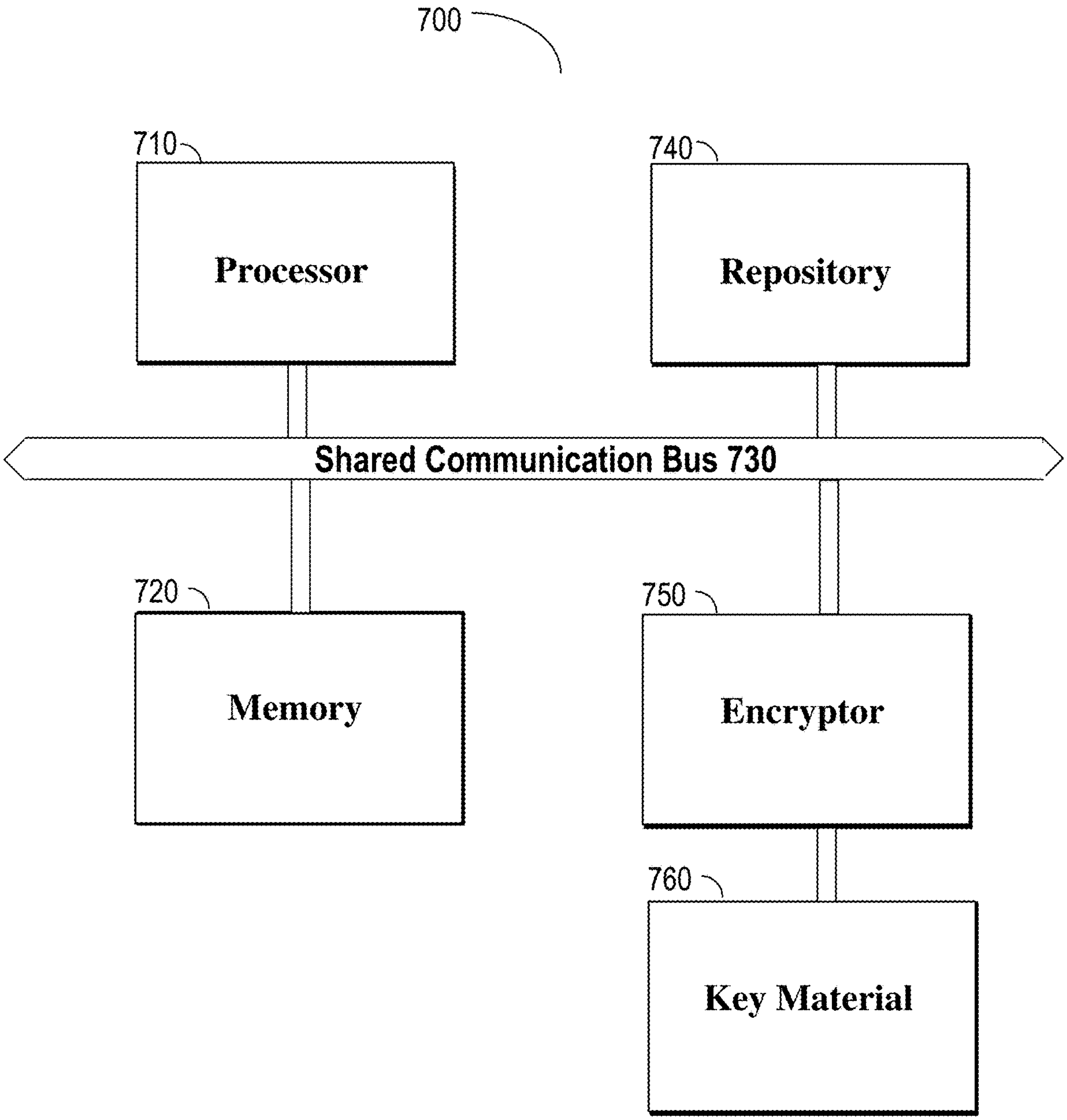
FIG. 7 illustrates an example apparatus for fast signature generation of a file.

FIG. 7 illustrates an example apparatus 700 for fast signature generation of a file. The apparatus comprises a processor 710, a memory 720, a shared communication bus 730, a repository 740, an encryptor 750 and encryption key material 760. For example, the processor 710 executes software and/or firmware algorithms to execute fast signature generation. In one example, the algorithms are stored in memory 720 or repository 740. For example, the algorithms include a hashing algorithm, a key generation algorithm, a signing algorithm, etc. For example, the encryption key material 760 includes a private key which is part of a matched asymmetric key pair.

Figure 8:
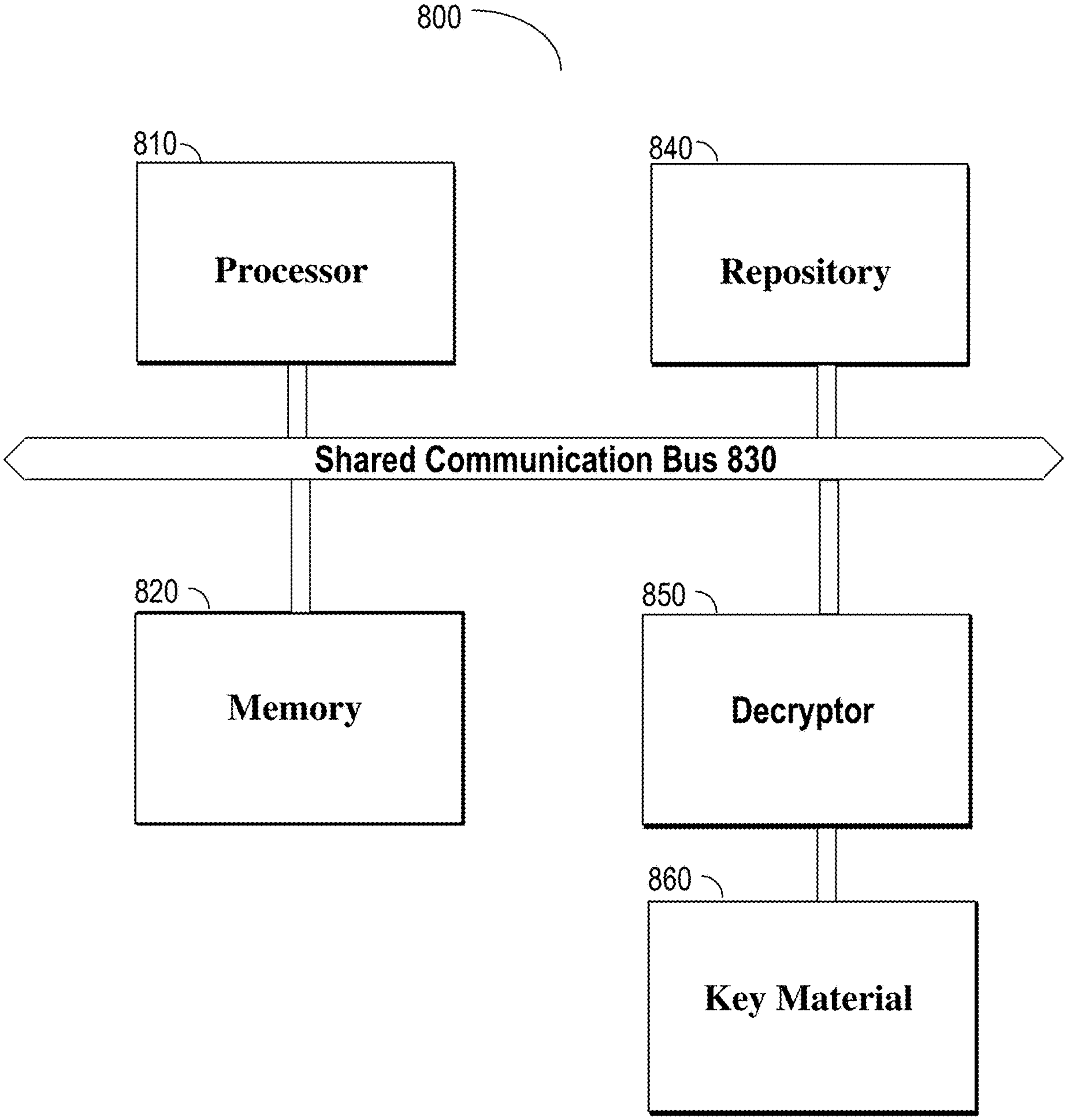
FIG. 8 illustrates an example apparatus for fast signature verification of a file.

FIG. 8 illustrates an example apparatus 800 for fast signature verification of a file. The apparatus comprises a processor 810, a memory 820, a shared communication bus 830, a repository 840, a decryptor 850 and decryption key material 860. For example, the processor 810 executes software and/or firmware algorithms to execute fast signature verification. In one example, the algorithms are stored in memory 820 or repository 840. For example, the algorithms include a hashing algorithm, a key generation algorithm, a verification algorithm, etc. For example, the decryption key material 860 includes a public key which is part of a matched asymmetric key pair.

In one aspect, one or more of the steps for providing fast signature generation and verification in the figures may be executed by one or more processors which may include hardware, software, firmware, etc. In one aspect, one or more of the steps for fast signature generation and verification in figures may be executed by one or more processors which may include hardware, software, firmware, etc. The one or more processors, for example, may be used to execute software or firmware needed to perform the steps in the flow diagram(s) of the figures. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may reside in a processing system, external to the processing system, or distributed across multiple entities including the processing system. The computer-readable medium may be embodied in a computer program product. By way of example, a computer program product may include a computer-readable medium in packaging materials. The computer-readable medium may include software or firmware for fast signature generation and verification. Those skilled in the art will recognize how best to implement the described functionality presented throughout this disclosure depending on the particular application and the overall design constraints imposed on the overall system.

Any circuitry included in the processor(s) is merely provided as an example, and other means for carrying out the described functions may be included within various aspects of the present disclosure, including but not limited to the instructions stored in the computer-readable medium, or any other suitable apparatus or means described herein, and utilizing, for example, the processes and/or algorithms described herein in relation to the example flow diagram.

Within the present disclosure, the word “exemplary” is used to mean “serving as an example, instance, or illustration.” Any implementation or aspect described herein as “exemplary” is not necessarily to be construed as preferred or advantageous over other aspects of the disclosure. Likewise, the term “aspects” does not require that all aspects of the disclosure include the discussed feature, advantage or mode of operation. The term “coupled” is used herein to refer to the direct or indirect coupling between two objects. For example, if object A physically touches object B, and object B touches object C, then objects A and C may still be considered coupled to one another—even if they do not directly physically touch each other. The terms “circuit” and “circuitry” are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in the figures may be rearranged and/or combined into a single component, box, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "box for."

What is claimed is:

1. An apparatus for fast digital signature verification of a file, the apparatus comprising,
- a memory configured for storing the file;
- a communication bus coupled to the memory, the communication bus configured for extracting a partial digest table from the file; and
- a processor coupled to the communication bus, the processor configured for:
  - decomposing the partial digest table to generate a delivered partial digest and a plurality of random addresses;
  - generating a recipient partial digest using a hash function;
  - comparing the recipient partial digest with the delivered partial digest to generate a comparison; and
  - determining a SUCCESS state for the file if the comparison results in a perfect agreement between the recipient partial digest and the delivered partial digest or determining a FAILED state for the file if the comparison results in a disagreement between the recipient partial digest and the delivered partial digest.

2. The apparatus of claim 1, wherein the hash function is a secure hash algorithm (SHA).

3. The apparatus of claim 1, wherein the processor is further configured for generating the recipient partial digest using a cryptographic key.

4. The apparatus of claim 3, wherein the cryptographic key is a public key associated with a private key, wherein the private key and the public key are part of a matched asymmetric key pair.

5. The apparatus of claim 1, wherein the processor is further configured for generating the recipient partial digest using the file.

6. The apparatus of claim 1, wherein the comparison is a bitwise logical exclusive OR (XOR) operation on the recipient partial digest and the delivered partial digest.

7. A method for fast digital signature verification of a file comprising,
- extracting a partial digest table from the file;
- decomposing the partial digest table to generate a delivered partial digest and a plurality of delivered random addresses;
- generating a recipient partial digest using a hash function;
- comparing the recipient partial digest with the delivered partial digest to generate a comparison; and
- determining a SUCCESS state for the file if the comparison results in a perfect agreement between the recipient partial digest and the delivered partial digest or determining a FAILED state for the file if the comparison results in a disagreement between the recipient partial digest and the delivered partial digest.

8. The method of claim 7, wherein the hash function is a secure hash algorithm (SHA).

9. The method of claim 7, further comprising generating the recipient partial digest using a cryptographic key.

10. The method of claim 9, wherein the cryptographic key is a public key associated with a private key, wherein the private key and the public key are part of a matched asymmetric key pair.

11. The method of claim 7, further comprising generating the recipient partial digest using the file.

12. The method of claim 7, wherein the comparison is a bitwise logical exclusive OR (XOR) operation on the recipient partial digest and the delivered partial digest.

13. A non-transitory computer-readable medium storing computer executable code, operable on a device comprising at least one processor and at least one memory coupled to the at least one processor, wherein the at least one processor is configured to implement a fast digital signature verification of a file, the computer executable code comprising:
- instructions for causing a computer to extract a partial digest table from the file;
- instructions for causing the computer to decompose the partial digest table to generate a delivered partial digest and a plurality of delivered random addresses;
- instructions for causing the computer to generate a recipient partial digest using a hash function;
- instructions for causing the computer to compare the recipient partial digest with the delivered partial digest to generate a comparison; and
- instructions for causing the computer to determine a SUCCESS state for the file if the comparison results in a perfect agreement between the recipient partial digest and the delivered partial digest or to determine a FAILED state for the file if the comparison results in a disagreement between the recipient partial digest and the delivered partial digest.

14. The non-transitory computer-readable medium of claim 13, further comprising instructions for causing the computer to generate the recipient partial digest using a cryptographic key, wherein the cryptographic key is a public key associated with a private key, wherein the private key and the public key are part of a matched asymmetric key pair.

15. The non-transitory computer-readable medium of claim 14, further comprising instructions for causing the computer to generate the recipient partial digest using the file.

* * * * *